US009405096B2

(12) United States Patent
Engelhardt

(10) Patent No.: US 9,405,096 B2
(45) Date of Patent: Aug. 2, 2016

(54) IMAGE SENSOR MODULES INCLUDING PRIMARY HIGH-RESOLUTION AND SECONDARY IMAGERS

(71) Applicant: Heptagon Micro Optics Pte. Ltd., Singapore (SG)

(72) Inventor: Kai Engelhardt, Buckenhof (DE)

(73) Assignee: Heptagon Micro Optics Pte, Ltd., Singapore (SG)

( * ) Notice: Subject to any disclaimer, the term of this patent is extended or adjusted under 35 U.S.C. 154(b) by 0 days.

(21) Appl. No.: 14/830,364

(22) Filed: Aug. 19, 2015

(65) Prior Publication Data

US 2016/0062082 A1    Mar. 3, 2016

Related U.S. Application Data

(60) Provisional application No. 62/043,585, filed on Aug. 29, 2014.

(51) Int. Cl.
*H04N 5/225* (2006.01)
*G02B 13/00* (2006.01)
*G02B 27/00* (2006.01)
*G02B 13/18* (2006.01)

(52) U.S. Cl.
CPC ........ *G02B 13/0015* (2013.01); *G02B 13/0085* (2013.01); *G02B 13/18* (2013.01); *G02B 27/0062* (2013.01); *H04N 5/2254* (2013.01)

(58) Field of Classification Search
CPC .................................................. G02B 13/0015
See application file for complete search history.

(56) References Cited

U.S. PATENT DOCUMENTS

| 8,662,765 B2 | 3/2014 | Reshidko et al. |
| 8,791,489 B2* | 7/2014 | Rudmann ............... H01L 31/12 257/81 |
| 9,000,377 B2* | 4/2015 | Rossi .................... G01S 17/026 250/341.8 |
| 9,291,504 B2* | 3/2016 | Goldring ................... G01J 3/10 |
| 2016/0006913 A1* | 1/2016 | Kettunen ............. H04N 5/2258 348/374 |

FOREIGN PATENT DOCUMENTS

WO    WO 2015/119571    8/2015

\* cited by examiner

*Primary Examiner* — Gary C Vieaux
(74) *Attorney, Agent, or Firm* — Fish & Richardson P.C.

(57) ABSTRACT

An optoelectronic module includes one or more image sensors including photosensitive regions. The module includes a first imager including a first stack of beam shaping elements disposed over the image sensor(s) to direct incoming light to a first photosensitive region, and a second imager including a second stack of beam shaping elements disposed over the image sensor(s) to direct incoming light to a second photosensitive region. Each particular stack includes a respective high-dispersion beam shaping element, where the high-dispersion beam shaping element of the first stack forms part of an achromatic doublet at an object side of the first stack. The high-dispersion beam shaping element in the second stack is part of a laterally contiguous array of beam shaping elements that does not include the high-dispersion beam shaping element that forms part of the achromatic doublet at the object side of the first stack.

24 Claims, 1 Drawing Sheet

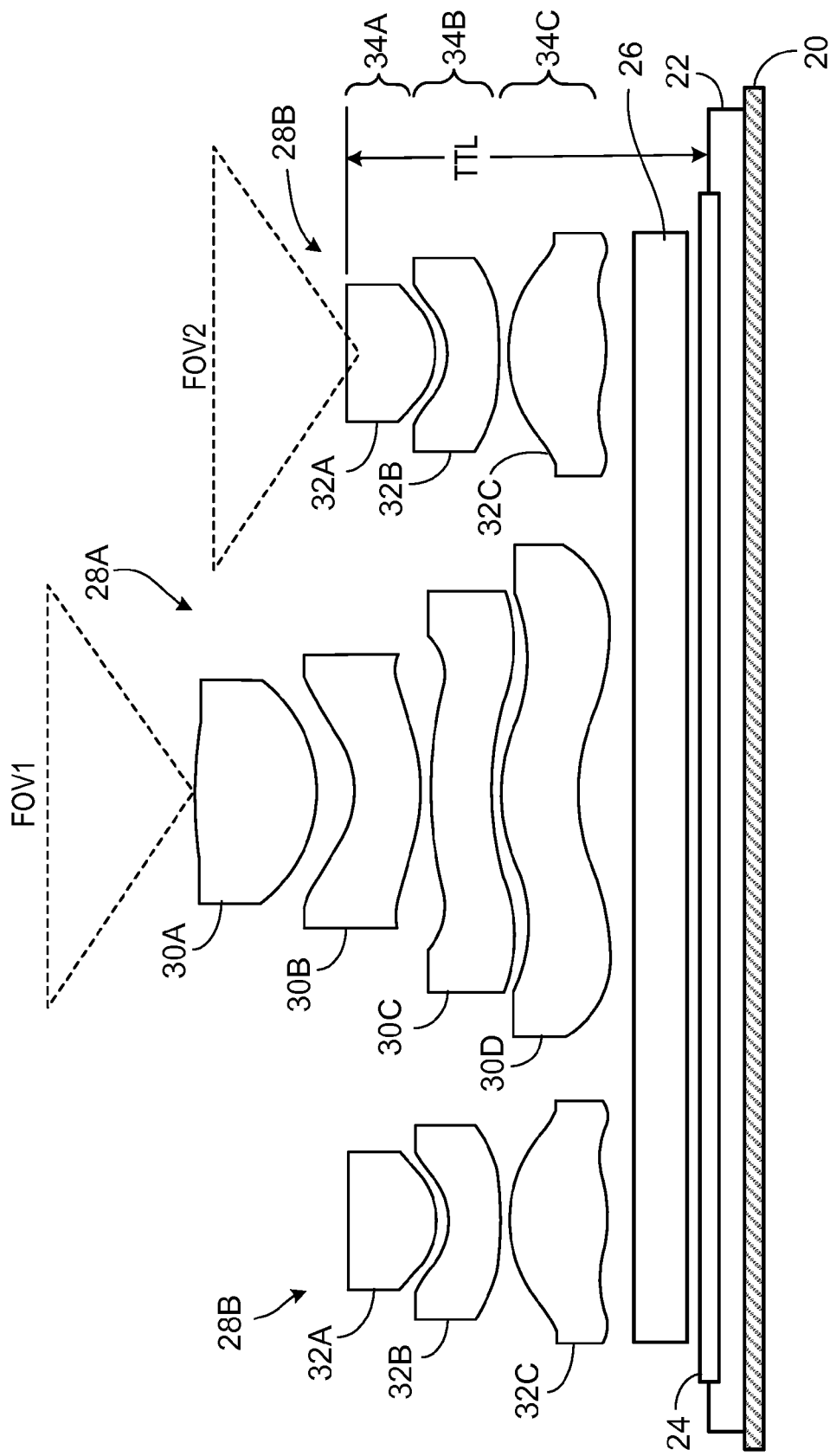

IMAGE SENSOR MODULES INCLUDING PRIMARY HIGH-RESOLUTION AND SECONDARY IMAGERS

CROSS-REFERENCE TO RELATED APPLICATIONS

This application claims the benefit of U.S. Provisional Application No. 62/043,585, filed Aug. 29, 2014, the contents of which are incorporated herein by reference in their entirety.

TECHNICAL FIELD

This disclosure relates to image sensor modules and, in particular, to image sensor modules that include primary high-resolution imagers and secondary imagers.

BACKGROUND

Image sensors are used in cameras and other imaging devices to capture images. For example, light entering through an aperture at one end of the imaging device is directed to an image sensor by a beam shaping system (e.g., one or more passive optical elements such as lenses). The image sensors include pixels that generate signals in response to sensing received light. Commonly used image sensors include CCD (charge-coupled device) image sensors and CMOS (complementary metal-oxide-semiconductor) sensors.

Some image sensors include high-resolution primary imagers, as well as secondary imagers that can be used to provide depth information. Various advantages can be obtained by providing the primary and secondary cameras with a small foot print (e.g., both may be positioned on the same semiconductor chip (i.e., on the same sensor)). On the other hand, fabricating such modules with an overall small footprint while at the same time providing the desired optical characteristics can present a range of technical challenges.

SUMMARY

This disclosure describes image sensor modules that include two or more imagers. Each of the imagers includes an optical channel having a respective stack of beam shaping elements (e.g., lenses). To achieve desired characteristics for the module, some of the beam shaping elements are formed as a laterally contiguous array, whereas other beam shaping elements are formed as a laterally non-contiguous array.

For example, in one aspect, an optoelectronic module that includes one or more image sensors. The module includes a first imager including a first stack of beam shaping elements disposed over the one or more image sensors to direct incoming light to a first photosensitive region of the one or more image sensors, and a second imager including a second stack of beam shaping elements disposed over the one or more image sensors to direct incoming light to a second photosensitive region of the one or more image sensors. Each particular stack includes a respective high-dispersion beam shaping element. The high-dispersion beam shaping element of the first stack forms part of an achromatic doublet at the object side of the first stack. The high-dispersion beam shaping element in the second stack is part of a laterally contiguous array of beam shaping elements that does not include the high-dispersion beam shaping element that forms part of the achromatic doublet at the object side of the first stack.

Some implementations include one or more of the following features. For example, the high-dispersion beam shaping element in the second stack can be part of a laterally contiguous array of beam shaping elements that includes a field-dependent aberration correction beam shaping element in the first stack. The field-dependent aberration correction beam shaping element in the first stack can be composed of the same material as the high-dispersion beam shaping element in the second stack.

In general, the first stack can include a greater number of beam shaping elements than the second stack. Each of the first and second stacks can include respective beam shaping elements that form an achromatic doublet for chromatic aberration correction and at least one additional beam shaping element for field-dependent aberration correction.

In some cases, the high-dispersion beam shaping element in the second stack also can be part of an achromatic doublet for chromatic aberration correction. Each achromatic doublet further can include a low-dispersion beam shaping element. The module may include a laterally non-contiguous array including the low-dispersion beam shaping element of the second stack and the high-dispersion beam shaping element of the first stack. However, the beam shaping elements that form the achromatic doublet of the first stack preferably are not part of a laterally contiguous array of beam shaping elements.

In some instances, the second stack includes, at its object side, a respective achromatic doublet including a low-dispersion beam shaping element having a positive refractive power and a high-dispersion beam shaping element having a negative refractive power.

Some implementations include one or more of the following advantages. For example, a compact imager can incorporate a high-quality primary imager and one or more secondary imagers for depth information. Preferably, all the imagers capture the same field-of-view. The primary and secondary imagers can be positioned in close proximity so as to reduce the overall footprint of the imager, while at the same time providing the desired optical properties for each channel. In some cases, the primary and secondary imagers may share a common sensor.

Other aspects, features and advantages will be readily apparent from the following detailed description, the accompanying drawings, and the claims.

BRIEF DESCRIPTION OF THE DRAWING(S)

FIG. 1 illustrates an example of an image sensor module.

DETAILED DESCRIPTION

As shown in FIG. 1, an optoelectronic module includes a high-resolution primary imager 28A and one or more secondary imagers 28B having a combined footprint that is relatively small. For example, in some implementations, the primary and secondary imagers 28A, 28B may share a common image sensor 22. The image sensor 22 can be implemented, for example, using CCD (charge-coupled device) or CMOS (complementary metal-oxide-semiconductor) technology and can be mounted, for example, on a printed circuit board (PCB) or other substrate 20. The image sensor 22 includes photosensitive regions 24. The primary camera 28A is operable to collect signals representing a primary two-dimensional (2-D) image; the secondary cameras can be used to provide additional secondary 2-D images that, for example, may be used for stereo matching and thus can provide three-dimensional (3-D) images or other depth information.

Each imager 28A, 28B includes a respective an optical assembly (i.e., a vertical stack of beam shaping elements (e.g., lenses)) that direct incoming light toward the respective photosensitive region of the corresponding imager. For example, in the illustrated example of FIG. 1, each optical channel in the primary imager 28A includes a stack of four lenses 30A, 30B, 30C, 30D. The lenses 30A-30D are stacked one over the other, with the lens 30A at the top of the stack (i.e., the object side) and the lens 30D at the bottom of the stack (i.e., the sensor side). Each of the second imagers 28B also includes a respective stack of three lenses 32A, 32B, 32C. The lenses 32A-32C are stacked one over the other, with the lens 32A at the top of the stack (i.e., the object side) and the lens 32C at the bottom of the stack (i.e., the sensor side). The lens stacks can be disposed over a common transparent substrate 26 that spans across all of the optical channels.

In the illustrated example of FIG. 1, each lens stack includes an achromatic doublet composed of the two lenses closest to the object side. These lenses can provide chromatic aberration correction. In some cases, they also may provide additional optical functions (e.g., magnifying power). Thus, the lenses 30A and 30B in the primary imager 28A form an achromatic doublet in which the upper lens 30A is composed of a low-dispersion material and is shaped to provide positive refractive power, and the lower lens 30B is composed of a high-dispersion material whereas is shaped to provide negative refractive power. Likewise, the lenses 32A and 32B in each secondary imager 28B form an achromatic doublet in which the upper lens 32A is composed of a low-dispersion material and is shaped to provide positive refractive power, whereas the lower lens 32B is composed of a high-dispersion material and is shaped to provide negative refractive power.

Each lens stack in FIG. 1 also includes at least one lens, for example, near the sensor side of the module for field-dependent aberration correction. In particular, the lenses 30C and 30D in the primary imager 28A provide such aberration correction, and the lens 32C in each secondary imager provides such aberration correction. In some cases, these lenses 30C, 30D, 32C also may provide additional optical functions.

In the illustrated example of FIG. 1, the module includes three lateral arrays 34A, 34B, 34C of beam shaping elements. The lateral array 34C near the sensor side of the module consists of lens 30D in the primary imager 28A and lenses 32C in the secondary imagers 28B. The next adjacent lateral array 34B consists of lens 30C in the primary imager 28A and lenses 32B in the secondary imagers 28B. The lateral array 34A consists of lens 30B in the primary imager 28A and lenses 32A in the secondary imagers 28B. The array 34A is formed as a laterally non-contiguous array, which allows the lenses in the different stacks to be formed of different materials and to be placed at the same or slightly different vertical positions. For example, as already mentioned, the lens 30B in the primary imager 28A is composed of a relatively high-dispersion material, whereas the lenses 32A in the secondary imagers 28B are composed of a relatively low-dispersion material.

The top (object side) lens 30A of the primary channel 28A and the top (object side) lenses 32A of the secondary channels 28B have positive refractive power and can be made of the same or different low-dispersion material. Preferably the lenses 30A, 32A have an Abbe number greater than 55, and a refractive index in the range of 1.51-1.54. Other values may be appropriate for some implementations. The second lens in each channel (i.e., 30B in the primary channel and 32B in the secondary channels) have negative refractive power and can be made of the same or different high-dispersion material. Preferably the lenses 30B, 32B have an Abbe number less than 35, and a refractive index greater than 1.56. Other values may be appropriate for some implementations.

On the other hand, each of the lower two lens arrays 34B, 34C can be formed as a laterally contiguous array. For example, each lens array 34B, 34C can be formed as a monolithic piece that spans across all the imagers 28A, 28B. Thus, all the lenses in a given one of the lateral arrays 34B, 34C are composed of the same high-dispersion of low-dispersion material, even though some of the lenses are associated with the primary imager 28A, and some of the lenses are associated with the secondary imagers 28B. In particular, in the illustrated example, the lenses 30D and 32C in the lateral array 34C are composed of a low-dispersion material, whereas the lenses 30C and 32B in the lateral array 34B are composed of a high-dispersion material. The use of laterally contiguous arrays for the lower lens arrays can help reduce the overall footprint of the module. Although the foregoing feature introduces constraints into the module's design (e.g., the high-dispersion material of the aberration correction lens 30C in the primary imager 28A), other properties of the various lenses can be designed collectively to account for the use of high-dispersion material of the lens 30C in the primary imager 28A. Further, as the lens 30C is designed for aberration correction and provides relatively low refractive power, the chromatic aberration generated by that lens is not significant. Thus, lenses 30C, 32B for different optical channels can be formed as part of a laterally contiguous lens array, where the lens for at least one of the optical channels (e.g., the channel for the secondary imager) is composed of a high-dispersion material and forms part of an achromatic doublet, whereas the lens(es) for another one of the optical channels (i.e., a channel for the primary imager) is designed primarily for field-dependent aberration correction.

The respective field-of-view of the primary and secondary imagers preferably are substantially the same. Thus, the field-of-view of the primary imager 28A (FOV1) is about the same as the field-of-view of each secondary imager 28B (FOV2). The higher resolution requirements for the primary imager 28A necessitate more sensor space than is typically required for the secondary imagers 28B, which can provide lower-quality images. The image-size restrictions on the sensor 22 and the close lateral proximity of the primary and secondary imagers 28A, 28B to one another can result in the secondary imagers having a relatively small focal length or track length (TTL).

In some implementations, in order to prevent the field-of-view of the secondary imagers 28B from being obstructed by the primary imager 28A, the effective total track length (TTL) for each optical lens stack of the secondary imagers 28B can be elongated. This can be accomplished, for example, by replacing some or all of the air gaps between adjacent lenses in a particular lens stack for the secondary imagers 28B with lens material. By replacing the air with a material having a refractive index greater than 1 (e.g., plastic or glass), the track length of the material is made thicker to accommodate the optical material. In effect, the thickness of some or all of the lenses in each secondary imager 28B can be increased to provide a correspondingly higher total track length. Although the precise extent of the increase in thickness of a particular lens will depend on the particular implementation, a general guideline is that the ultimate thickness of the lens material should be about equal to the product of the refractive index of the lens material and the thickness of the air gap that would otherwise be present.

The optical channel for each secondary imager 28B includes an aperture stop that preferably is placed in front of the first lens element. Thus, the aperture stop defines the base of the cone of light entering the secondary imager. Preferably, the aperture stop is placed far in front of the top lens 32A to avoid interfering mechanically with the optical channel of the primary imager 28A. The position of the aperture stop also should be selected to avoid generating optical aberrations (e.g., coma).

In general, the number of lenses stacked vertically for the primary imager 28A will be greater than the number of lenses stacked vertically in each secondary imager 28B, the number of lenses in some, or all, of the lens stacks may differ from that shown in FIG. 1. Thus, for example, in some cases, the primary imager can include a stack of more than four lens elements (e.g., five), and each secondary imager can include a stack of more than three lens elements (e.g., four). In other instances, the primary imager can include a stack of five lens elements, and each secondary imager can include a stack of three lens elements. In any event, the upper two lenses in each particular channel can form an achromatic doublet designed for chromatic aberration correction. In the secondary imagers, the top (object side) lens in each particular channel preferably has positive refractive power, and the adjacent lens in the same particular channel preferably has negative refractive power. The remaining lens elements in each stack can be designed to correct for field-dependent aberraation.

Some implementations may include more than two secondary imagers each of which can include a stack of beam shaping elements having substantially the same number and properties as the stack of beam shaping elements of the secondary imagers as described above.

The following tables are intended to provide further details relating to one or more implementations of the modules. Tables 1-8 relate to the primary imager; tables 9-16 relate to the secondary imager(s). The details set forth in the tables below may differ in some or all respects for other implementations.

TABLE 1

General properties of optics for primary imager

| | |
|---|---|
| 100% IH = 1.542 mm | |
| Surfaces | 13 |
| Stop | 2 |
| System Aperture | Float By Stop Size = 0.385 |
| Glass Catalogs | |
| Ray Aiming | Paraxial Reference, Cache On |
| X Pupil Shift | 0 |
| Y Pupil Shift | 0 |
| Z Pupil Shift | 0 |
| X Pupil Compress | 0 |
| Y Pupil Compress | 0 |
| Apodization | uniform, factor = 0.00000E+000 |
| Temperature (C.) | 2.00000E+001 |
| Pressure (ATM) | 1.00000E+000 |
| Adjust Index Data To Environment | off |
| Effective Focal Length | 1.858154 (in air at system temperature and pressure) |
| Effective Focal Length | 1.858154 (in image space) |
| Back Focal Length | 0.1527153 |
| Total Track | 2.994764 |
| Image Space F/# | 2.413187 |
| Paraxial Working F/# | 2.422211 |
| Working F/# | 2.381951 |
| Image Space NA | 0.2021608 |
| Object Space NA | 0.0007698458 |
| Stop Radius | 0.385 |
| Paraxial Image Height | 1.567782 |
| Paraxial Magnification | −0.00379459 |
| Entrance Pupil Diameter | 0.77 |
| Entrance Pupil Position | 0.1 |
| Exit Pupil Diameter | 0.767942 |
| Exit Pupil Position | −1.850472 |
| Field Type | Angle in degrees |
| Maximum Radial Field | 40.05 |
| Primary Wavelength | 0.5461 μm |
| Lens Units | Millimeters |
| Angular Magnification | 1.00268 |

TABLE 2

Fields - primary imager
Fields: 12
Field Type: Angle in degrees

| # | X-Value | Y-Value | Weight |
|---|---|---|---|
| 1 | 0.000000 | 0.000000 | 1.000000 |
| 2 | 0.000000 | 12.060454 | 1.000000 |
| 3 | 0.000000 | 17.056057 | 1.000000 |
| 4 | 0.000000 | 22.100000 | 1.000000 |
| 5 | 0.000000 | 24.120908 | 1.000000 |
| 6 | 0.000000 | 26.967994 | 1.000000 |
| 7 | 0.000000 | 29.541958 | 1.000000 |
| 8 | 0.000000 | 31.908961 | 1.000000 |
| 9 | 0.000000 | 34.112115 | 1.000000 |
| 10 | 0.000000 | 35.700000 | 1.000000 |
| 11 | 0.000000 | 38.138504 | 1.000000 |
| 12 | 0.000000 | 40.050000 | 1.000000 |

TABLE 3

Vignetting Factors - primary imager

| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |
| 4 | 0.000000 | 0.000000 | 0.000000 | 0.000000 | 0.000000 |
| 5 | 0.000000 | 0.000000 | 0.000000 | 0.000000 | 0.000000 |
| 6 | 0.000000 | 0.000000 | 0.000000 | 0.000000 | 0.000000 |
| 7 | 0.000000 | 0.000000 | 0.000000 | 0.000000 | 0.000000 |
| 8 | 0.000000 | 0.000000 | 0.000000 | 0.000000 | 0.000000 |
| 9 | 0.000000 | 0.000000 | 0.000000 | 0.000000 | 0.000000 |
| 10 | 0.000000 | 0.000000 | 0.000000 | 0.000000 | 0.000000 |
| 11 | 0.000000 | 0.000000 | 0.000000 | 0.000000 | 0.000000 |
| 12 | 0.000000 | 0.000000 | 0.000000 | 0.000000 | 0.000000 |

TABLE 4

Wavelengths - primary imager
units: μm

| # | value | weight |
|---|---|---|
| 1 | 0.435800 | 10.000000 |
| 2 | 0.486100 | 17.000000 |
| 3 | 0.546100 | 32.000000 |
| 4 | 0.587600 | 28.000000 |
| 5 | 0.656300 | 14.000000 |

TABLE 5

Surface data summary - primary imager

| Surf | Type | Radius | Thickness | Glass | Diameter | Conic | Comment |
|---|---|---|---|---|---|---|---|
| OBJ | STANDARD | Infinity | 500 | | 840.7559 | 0 | |
| 1 | STANDARD | Infinity | 0.1 | | 1.017964 | 0 | |
| STO | STANDARD | Infinity | 0.015 | | 0.77 | 0 | |
| 3 | EVENASPH | Infinity | 0.7 | 1.544919, 55.929938 | 0.94 | 0 | L1-1 |
| 4 | EVENASPH | Infinity | 0.2193477 | | 1.27 | 0 | L1-2 |
| 5 | EVENASPH | Infinity | 0.379 | 1.637900, 23.308938 | 1.324 | 0 | L2-1 |
| 6 | EVENASPH | Infinity | 0.06708561 | | 1.536 | 0 | L2-2 |
| 7 | EVENASPH | Infinity | 0.353 | 1.637900, 23.308938 | 1.75 | 0 | L3-1 |
| 8 | EVENASPH | Infinity | 0.06708557 | | 2.23 | 0 | L3-2 |
| 9 | EVENASPH | Infinity | 0.436 | 1.535014, 55.692544 | 2.34 | 0 | L4-1 |
| 10 | EVENASPH | Infinity | 0.2082446 | | 2.734 | 0 | L4-2 |
| 11 | STANDARD | Infinity | 0.3 | 1.516800, 64.167336 | 2.889659 | 0 | CG |
| 12 | STANDARD | Infinity | 0.15 | | 3.037802 | 0 | |
| IMA | STANDARD | Infinity | | | 3.075869 | 0 | |

TABLE 6

Surface data details - primary imager

Surface OBJ STANDARD
Surface 1 STANDARD
Surface STO STANDARD
Surface 3 EVENASPH L1-1

| | |
|---|---|
| Coefficient on r^2 | 0.27968609 |
| Coefficient on r^4 | −0.2991295 |
| Coefficient on r^6 | −0.42082126 |
| Coefficient on r^8 | −3.6053673 |
| Coefficient on r^10 | 0 |
| Coefficient on r^12 | 0 |
| Coefficient on r^14 | 0 |
| Coefficient on r^16 | 0 |
| Aperture | Floating Aperture |
| Maximum Radius | 0.47 |

Surface 4 EVENASPH L1-2

| | |
|---|---|
| Coefficient on r^2 | −0.62582494 |
| Coefficient on r^4 | −0.41392061 |
| Coefficient on r^6 | 0.2210383 |
| Coefficient on r^8 | −0.95601401 |
| Coefficient on r^10 | 0 |
| Coefficient on r^12 | 0 |
| Coefficient on r^14 | 0 |
| Coefficient on r^16 | 0 |
| Aperture | Floating Aperture |
| Maximum Radius | 0.635 |

Surface 5 EVENASPH L2-1

| | |
|---|---|
| Coefficient on r^2 | −1.096117 |
| Coefficient on r^4 | 0.66300841 |
| Coefficient on r^6 | 0.80122276 |
| Coefficient on r^8 | −0.22383053 |
| Coefficient on r^10 | 0 |
| Coefficient on r^12 | 0 |
| Coefficient on r^14 | 0 |
| Coefficient on r^16 | 0 |
| Aperture | Floating Aperture |
| Maximum Radius | 0.662 |

Surface 6 EVENASPH L2-2

| | |
|---|---|
| Coefficient on r^2 | −0.47049198 |
| Coefficient on r^4 | 0.27749396 |
| Coefficient on r^6 | −0.14332913 |
| Coefficient on r^8 | 0.6634148 |
| Coefficient on r^10 | 0 |
| Coefficient on r^12 | 0 |
| Coefficient on r^14 | 0 |
| Coefficient on r^16 | 0 |
| Aperture | Floating Aperture |
| Maximum Radius | 0.768 |

Surface 7 EVENASPH L3-1

| | |
|---|---|
| Coefficient on r^2 | 0.22597349 |
| Coefficient on r^4 | 0.36093422 |
| Coefficient on r^6 | −1.9277157 |
| Coefficient on r^8 | 2.8468809 |
| Coefficient on r^10 | −2.4050601 |
| Coefficient on r^12 | 0.60484699 |
| Coefficient on r^14 | 0 |
| Coefficient on r^16 | 0 |
| Aperture | Floating Aperture |
| Maximum Radius | 0.875 |

Surface 8 EVENASPH L3-2

| | |
|---|---|
| Coefficient on r^2 | 0.30074666 |
| Coefficient on r^4 | 0.054752217 |
| Coefficient on r^6 | −0.72010582 |
| Coefficient on r^8 | 0.85243312 |
| Coefficient on r^10 | −0.54478282 |
| Coefficient on r^12 | 0.15635114 |
| Coefficient on r^14 | 0 |
| Coefficient on r^16 | 0 |
| Aperture | Floating Aperture |
| Maximum Radius | 1.115 |

Surface 9 EVENASPH L4-1

| | |
|---|---|
| Coefficient on r^2 | 0.69715106 |
| Coefficient on r^4 | −1.1857992 |
| Coefficient on r^6 | 1.0065905 |
| Coefficient on r^8 | −0.70869252 |
| Coefficient on r^10 | 0.38778321 |
| Coefficient on r^12 | −0.10586822 |
| Coefficient on r^14 | 0.0084956013 |
| Coefficient on r^16 | 0 |
| Aperture | Floating Aperture |
| Maximum Radius | 1.17 |

Surface 10 EVENASPH L4-2

| | |
|---|---|
| Coefficient on r^2 | 0.59374217 |
| Coefficient on r^4 | −0.79559643 |
| Coefficient on r^6 | 0.55726202 |
| Coefficient on r^8 | −0.25233833 |
| Coefficient on r^10 | 0.058308261 |
| Coefficient on r^12 | −0.0058827675 |
| Coefficient on r^14 | 0 |
| Coefficient on r^16 | 0 |
| Aperture | Floating Aperture |
| Maximum Radius | 1.367 |

Surface 11 STANDARD CG
Surface 12 STANDARD
Surface IMA STANDARD

TABLE 7

Index of refraction data - primary imager

System Temperature: 20.0000 Celsius
System Pressure: 1.0000 Atmospheres
Absolute air index: 1.000273 at wavelength 0.546100 μm
Index data is relative to air at the system temperature and pressure.
wavelengths are measured in air at the system temperature and pressure.

| Surf | Glass | Temp | Pres | 0.435800 | 0.486100 | 0.546100 | 0.587600 | 0.656300 |
|---|---|---|---|---|---|---|---|---|
| 0 |  | 20.00 | 1.00 | 1.00000000 | 1.00000000 | 1.00000000 | 1.00000000 | 1.00000000 |
| 1 |  | 20.00 | 1.00 | 1.00000000 | 1.00000000 | 1.00000000 | 1.00000000 | 1.00000000 |
| 2 |  | 20.00 | 1.00 | 1.00000000 | 1.00000000 | 1.00000000 | 1.00000000 | 1.00000000 |
| 3 | <MODEL> | 20.00 | 1.00 | 1.55706483 | 1.55170890 | 1.54723933 | 1.54491901 | 1.54196599 |
| 4 |  | 20.00 | 1.00 | 1.00000000 | 1.00000000 | 1.00000000 | 1.00000000 | 1.00000000 |
| 5 | <MODEL> | 20.00 | 1.00 | 1.67396073 | 1.65741465 | 1.64435653 | 1.63790003 | 1.63004742 |
| 6 |  | 20.00 | 1.00 | 1.00000000 | 1.00000000 | 1.00000000 | 1.00000000 | 1.00000000 |
| 7 | <MODEL> | 20.00 | 1.00 | 1.67396073 | 1.65741465 | 1.64435653 | 1.63790003 | 1.63004742 |
| 8 |  | 20.00 | 1.00 | 1.00000000 | 1.00000000 | 1.00000000 | 1.00000000 | 1.00000000 |
| 9 | <MODEL> | 20.00 | 1.00 | 1.54699485 | 1.54171002 | 1.53730171 | 1.53501401 | 1.53210344 |
| 10 |  | 20.00 | 1.00 | 1.00000000 | 1.00000000 | 1.00000000 | 1.00000000 | 1.00000000 |
| 11 | <MODEL> | 20.00 | 1.00 | 1.52668649 | 1.52237786 | 1.51872294 | 1.51680001 | 1.51432390 |
| 12 |  | 20.00 | 1.00 | 1.00000000 | 1.00000000 | 1.00000000 | 1.00000000 | 1.00000000 |
| 13 |  | 20.00 | 1.00 | 1.00000000 | 1.00000000 | 1.00000000 | 1.00000000 | 1.00000000 |

TABLE 8

Thermal coefficient of expansion data - primary imager

| surf | Glass | TCE * 10E−6 |
|---|---|---|
| 0 |  | 0.00000000 |
| 1 |  | 0.00000000 |
| 2 |  | 0.00000000 |
| 3 | <MODEL> | 0.00000000 |
| 4 |  | 0.00000000 |
| 5 | <MODEL> | 0.00000000 |
| 6 |  | 0.00000000 |
| 7 | <MODEL> | 0.00000000 |
| 8 |  | 0.00000000 |
| 9 | <MODEL> | 0.00000000 |
| 10 |  | 0.00000000 |
| 11 | <MODEL> | 0.00000000 |
| 12 |  | 0.00000000 |
| 13 |  | 0.00000000 |

TABLE 9

General properties of optics for secondary imager(s)

| | |
|---|---|
| 100% IH = 0.6425 mm | |
| Surfaces | 12 |
| Stop | 2 |
| System Aperture | Float By Stop Size = 0.115 |
| Glass Catalogs | |
| Ray Aiming | off |
| Apodization | Uniform, factor = 0.00000E+000 |
| Temperature (C.) | 2.50000E+001 |
| Pressure (ATM) | 1.00000E+000 |
| Adjust Index Data To Environment | On |
| Effective Focal Length | 0.7519028 (in air at system temperature and pressure) |
| Effective Focal Length | 0.7519028 (in image space) |
| Back Focal Length | 0.1481415 |
| Total Track | 2.181019 |
| Image Space F/# | 3.269142 |
| Paraxial Working F/# | 3.267982 |
| Working F/# | 3.236713 |
| Image Space NA | 0.1512397 |
| Object Space NA | 0.000229954 |
| Stop Radius | 0.115 |
| Paraxial Image Height | 0.6425 |

TABLE 9-continued

General properties of optics for secondary imager(s)

| | |
|---|---|
| Paraxial Magnification | −0.001502971 |
| Entrance Pupil Diameter | 0.23 |
| Entrance Pupil Position | 0.1 |
| Exit Pupil Diameter | 0.9738522 |
| Entrance Pupil Position | 0.1 |
| Exit Pupil Diameter | 0.9738522 |
| Exit Pupil Position | 3.181802 |
| Field Type | Real Image height in Millimeters |
| Maximum Radial Field | 0.6425 |
| Primary Wavelength | 0.6 μm |
| Lens Units | Millimeters |
| Angular Magnification | −0.2362822 |

TABLE 10

Fields - secondary imager(s)
Fields: 12
Field Type: Real Image height in Millimeters

| # | X-value | Y-value | Weight |
|---|---|---|---|
| 1 | 0.000000 | 0.000000 | 1.000000 |
| 2 | 0.000000 | 0.193721 | 1.000000 |
| 3 | 0.000000 | 0.273963 | 1.000000 |
| 4 | 0.000000 | 0.335535 | 1.000000 |
| 5 | 0.000000 | 0.387442 | 1.000000 |
| 6 | 0.000000 | 0.433173 | 1.000000 |
| 7 | 0.000000 | 0.474518 | 1.000000 |
| 8 | 0.000000 | 0.512538 | 1.000000 |
| 9 | 0.000000 | 0.547926 | 1.000000 |
| 10 | 0.000000 | 0.581163 | 1.000000 |
| 11 | 0.000000 | 0.612600 | 1.000000 |
| 12 | 0.000000 | 0.642500 | 1.000000 |

TABLE 11

Vignetting Factors - secondary imager(s)

| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |
| 4 | 0.000000 | 0.000000 | 0.000000 | 0.000000 | 0.000000 |

TABLE 11-continued

Vignetting Factors - secondary imager(s)

| # | VDX | VDY | VCX | VCY | VAN |
|---|---|---|---|---|---|
| 5 | 0.000000 | 0.000000 | 0.000000 | 0.000000 | 0.000000 |
| 6 | 0.000000 | 0.000000 | 0.000000 | 0.000000 | 0.000000 |
| 7 | 0.000000 | 0.000000 | 0.000000 | 0.000000 | 0.000000 |
| 8 | 0.000000 | 0.000000 | 0.000000 | 0.000000 | 0.000000 |
| 9 | 0.000000 | 0.000000 | 0.000000 | 0.000000 | 0.000000 |
| 10 | 0.000000 | 0.000000 | 0.000000 | 0.000000 | 0.000000 |
| 11 | 0.000000 | 0.000000 | 0.000000 | 0.000000 | 0.000000 |
| 12 | 0.000000 | 0.000000 | 0.000000 | 0.000000 | 0.000000 |

TABLE 12

Wavelengths - secondary imager(s)
units: μm

| # | value | weight |
|---|---|---|
| 1 | 0.565000 | 0.100000 |
| 2 | 0.575000 | 0.500000 |
| 3 | 0.600000 | 1.000000 |
| 4 | 0.680000 | 0.500000 |
| 5 | 0.720000 | 0.050000 |

TABLE 13

Surface data summary - secondary imager(s)

| Surf | Type | Radius | Thickness | Glass | Diameter | Conic | Comment |
|---|---|---|---|---|---|---|---|
| OBJ | STANDARD | Infinity | 500 | | 871.796 | 0 | |
| 1 | STANDARD | Infinity | 0.1 | | 0.4642783 | 0 | |
| STO | STANDARD | Infinity | 0.09 | | 0.23 | 0 | |
| 3 | EVENASPH | 3.886472 | 0.509 | 1.535014, 55.692544 | 0.4434537 | 0 | L2-1 |
| 4 | EVENASPH | −0.5782696 | 0.06487581 | | 0.779078 | 0 | L2-2 |
| 5 | EVENASPH | −0.5383768 | 0.303 | 1.637900, 23.3085938 | 0.8343546 | 0 | L3-1 |
| 6 | EVENASPH | −1.698374 | 0.05130877 | | 1.099612 | 0 | L3-2 |
| 7 | EVENASPH | 0.713348 | 0.565 | 1.535014, 55.692544 | 1.327271 | 0 | L4-1 |
| 8 | EVENASPH | −0.7618981 | 0.04783424 | | 1.378691 | 0 | L4-2 |
| 9 | STANDARD | Infinity | 0.3 | 1.516800, 64.167336 | 1.372736 | 0 | CG |
| 10 | STANDARD | Infinity | 0.15 | | 1.353753 | 0 | |
| 11 | STANDARD | Infinity | 0 | | 1.353471 | 0 | |
| IMA | STANDARD | Infinity | | | 1.293471 | 0 | |

TABLE 14

Surface data details - secondary imager(s)

Surface OBJ STANDARD
Surface 1 STANDARD
Surface STO STANDARD
Surface 3 EVENASPH L2-1

| | |
|---|---|
| Coefficient on r∧ 2 | 0 |
| Coefficient on r∧ 4 | −8.2149538 |
| Coefficient on r∧ 6 | 357.50983 |
| Coefficient on r∧ 8 | −16774.664 |
| Coefficient on r∧10 | 368592.59 |
| Coefficient on r∧12 | −3038141.5 |
| Coefficient on r∧14 | 0 |
| Coefficient on r∧16 | 0 |

Surface 4 EVENASPH L2-2

| | |
|---|---|
| Coefficient on r∧ 2 | 0 |
| Coefficient on r∧ 4 | −20.095362 |
| Coefficient on r∧ 6 | 292.3116 |
| Coefficient on r∧ 8 | −2265.8684 |
| Coefficient on r∧10 | 9377.0861 |
| Coefficient on r∧12 | −13967.822 |
| Coefficient on r∧14 | 0 |
| Coefficient on r∧16 | 0 |

TABLE 14-continued

Surface data details - secondary imager(s)

Surface 5 EVENASPH L3-1

| | |
|---|---|
| Coefficient on r∧ 2 | 0 |
| Coefficient on r∧ 4 | −15.043092 |
| Coefficient on r∧ 6 | 155.53925 |
| Coefficient on r∧ 8 | −493.80101 |
| Coefficient on r∧10 | 610.8048 |
| Coefficient on r∧12 | 0 |
| Coefficient on r∧14 | 0 |
| Coefficient on r∧16 | 0 |

Surface 6 EVENASPH L3-2

| | |
|---|---|
| Coefficient on r∧ 2 | 0 |
| Coefficient on r∧ 4 | 2.4006246 |
| Coefficient on r∧ 6 | −33.994105 |
| Coefficient on r∧ 8 | 119.61178 |
| Coefficient on r∧10 | −133.14971 |
| Coefficient on r∧12 | 0 |
| Coefficient on r∧14 | 0 |
| Coefficient on r∧16 | 0 |

Surface 7 EVENASPH L4-1

| | |
|---|---|
| Coefficient on r∧ 2 | 0 |
| Coefficient on r∧ 4 | 1.0814679 |
| Coefficient on r∧ 6 | −8.958408 |
| Coefficient on r∧ 8 | 25.738143 |

TABLE 14-continued

Surface data details - secondary imager(s)

| | |
|---|---|
| Coefficient on r∧10 | −43.208755 |
| Coefficient on r∧12 | 16.62109 |
| Coefficient on r∧14 | 0 |
| Coefficient on r∧16 | 0 |

Surface 8 EVENASPH L4-2

| | |
|---|---|
| Coefficient on r∧ 2 | 0 |
| Coefficient on r∧ 4 | 0.64830739 |
| Coefficient on r∧ 6 | 24.821305 |
| Coefficient on r∧ 8 | −102.1503 |
| Coefficient on r∧10 | 156.58618 |
| Coefficient on r∧12 | −85.760241 |
| Coefficient on r∧14 | 0 |
| Coefficient on r∧16 | 0 |

Surface 9 STANDARD CG
Surface 10 STANDARD
Surface 11 STANDARD
Surface IMA STANDARD

TABLE 15

Index of refraction data - secondary imager(s)

System Temperature: 25.0000 Celsius
System Pressure: 1.0000 Atmospheres
Absolute air index: 1.000268 at wavelength 0.600000 μm
Index data is relative to air at the system temperature and pressure.
wavelengths are measured in air at the system temperature and pressure.

| Surf | Glass | Temp | Pres | 0.565000 | 0.575000 | 0.600000 | 0.680000 | 0.720000 |
|---|---|---|---|---|---|---|---|---|
| 0 | | 25.00 | 1.00 | 1.00000000 | 1.00000000 | 1.00000000 | 1.00000000 | 1.00000000 |
| 1 | | 25.00 | 1.00 | 1.00000000 | 1.00000000 | 1.00000000 | 1.00000000 | 1.00000000 |
| 2 | | 25.00 | 1.00 | 1.00000000 | 1.00000000 | 1.00000000 | 1.00000000 | 1.00000000 |
| 3 | <MODEL> | 25.00 | 1.00 | 1.53619851 | 1.53565764 | 1.53441836 | 1.53128407 | 1.53006255 |
| 4 | | 25.00 | 1.00 | 1.00000000 | 1.00000000 | 1.00000000 | 1.00000000 | 1.00000000 |
| 5 | <MODEL> | 25.00 | 1.00 | 1.64121342 | 1.63969238 | 1.63625877 | 1.62791538 | 1.62480421 |
| 6 | | 25.00 | 1.00 | 1.00000000 | 1.00000000 | 1.00000000 | 1.00000000 | 1.00000000 |
| 7 | <MODEL> | 25.00 | 1.00 | 1.53619851 | 1.53565764 | 1.53441836 | 1.53128407 | 1.53006255 |
| 8 | | 25.00 | 1.00 | 1.00000000 | 1.00000000 | 1.00000000 | 1.00000000 | 1.00000000 |
| 9 | <MODEL> | 25.00 | 1.00 | 1.51779806 | 1.51734299 | 1.51629607 | 1.51362041 | 1.51256612 |
| 10 | | 25.00 | 1.00 | 1.00000000 | 1.00000000 | 1.00000000 | 1.00000000 | 1.00000000 |
| 11 | | 25.00 | 1.00 | 1.00000000 | 1.00000000 | 1.00000000 | 1.00000000 | 1.00000000 |
| 12 | | 25.00 | 1.00 | 1.00000000 | 1.00000000 | 1.00000000 | 1.00000000 | 1.00000000 |

TABLE 16

Thermal coefficient of expansion data - secondary imager(s)

| Surf | Glass | TCE * 10E−6 |
|---|---|---|
| 0 | | 0.00000000 |
| 1 | | 0.00000000 |
| 2 | | 0.00000000 |
| 3 | <MODEL> | 0.00000000 |
| 4 | | 0.00000000 |
| 5 | <MODEL> | 0.00000000 |
| 6 | | 0.00000000 |
| 7 | <MODEL> | 0.00000000 |
| 8 | | 0.00000000 |
| 9 | <MODEL> | 0.00000000 |
| 10 | | 0.00000000 |
| 11 | | 0.00000000 |
| 12 | | 0.00000000 |

Various modifications can be made within the spirit of the invention. Accordingly, other implementations are within the scope of the claims.

What is claimed is:

1. An optoelectronic module comprising:
one or more image sensors including photosensitive regions;
a first imager including a first stack of beam shaping elements disposed over the one or more image sensors to direct incoming light to a first photosensitive region, the first stack having a sensor side and an object side;
a second imager including a second stack of beam shaping elements disposed over the one or more image sensors to direct incoming light to a second photosensitive region, the second stack having a sensor side and an object side;
wherein each particular stack includes a respective high-dispersion beam shaping element, the high-dispersion beam shaping element of the first stack forming part of an achromatic doublet at the object side of the first stack, and
wherein the high-dispersion beam shaping element in the second stack is part of a laterally contiguous array of beam shaping elements that does not include the high-dispersion beam shaping element that forms part of the achromatic doublet at the object side of the first stack.

2. The module of claim 1 wherein the high-dispersion beam shaping element in the second stack is part of a laterally contiguous array of beam shaping elements that includes a field-dependent aberration correction beam shaping element in the first stack.

3. The module of claim 2 wherein the field-dependent aberration correction beam shaping element in the first stack is composed of the same material as the high-dispersion beam shaping element in the second stack.

4. The module of claim 1 wherein the high-dispersion beam shaping element in the second stack is part of an achromatic doublet for chromatic aberration correction.

5. The module of claim 4 wherein each achromatic doublet further includes a low-dispersion beam shaping element, and wherein the module includes a laterally non-contiguous array including the low-dispersion beam shaping element of the second stack and the high-dispersion beam shaping element of the first stack.

6. The module of claim 1 wherein the second stack includes, at its object side, a respective achromatic doublet including a low-dispersion beam shaping element having a positive refractive power and a high-dispersion beam shaping element having a negative refractive power.

7. The module of claim 5 wherein the beam shaping elements that form the achromatic doublet of the first stack are not part of a laterally contiguous array of beam shaping elements.

8. The module of claim 1 wherein the first stack includes a greater number of beam shaping elements than the second stack.

9. The module of claim 8 wherein the first stack includes at least four beam shaping elements, and wherein the second stack includes three beam shaping elements.

10. The module of claim 8 wherein the first stack has four beam shaping elements, and wherein the second stack has three beam shaping elements.

11. The module of claim 8 wherein the first stack has five beam shaping elements, and wherein the second stack has three beam shaping elements.

12. The module of claim 8 wherein each of the first and second stacks includes respective beam shaping elements that form an achromatic doublet for chromatic aberration correction and at least one additional beam shaping element for field-dependent aberration correction.

13. The module of claim 12 wherein the one or more beam shaping elements of each particular stack that provide field-dependent aberration correction are closer to the image sensor than the beam shaping elements of the achromatic doublet for the particular stack.

14. The module of claim 1 further including a second laterally contiguous array of beam shaping elements that includes a respective field-dependent aberration correction beam shaping element for each stack.

15. The module of claim 1 further including at least one additional imager that includes a stack of beam shaping elements having substantially the same number and properties as the stack of beam shaping elements of the second imager.

16. The module of claim 1 wherein the first and second imagers have substantially the same field-of-view.

17. The module of claim 1 wherein the beam shaping elements are lenses.

18. An optoelectronic module comprising:
one or more image sensors including photosensitive regions;
a first imager including a first optical channel that includes a first vertical stack of at least four lenses disposed over the one or more image sensors to direct incoming light to a first photosensitive region;
a second imager including a second optical channel that includes a vertical stack of least three lenses disposed over the one or more image sensors to direct incoming light to a second photosensitive region, wherein the second imager has substantially the same field-of-view as the first imager, and wherein the second stack has fewer lenses than the first stack;
wherein each particular vertical stack includes a respective pair of lenses for chromatic aberration correction and at least one additional lens for field-dependent aberration correction, wherein the lenses in each particular vertical stack for chromatic aberration correction are further from the image sensor than the at least one lens for field-dependent aberration correction in the particular stack,
wherein each pair of lenses for chromatic aberration correction includes a first and second lens, the first lens resulting in lower-dispersion than the second lens, the first lens having positive refractive power and the second lens having negative refractive power, and
wherein the second lens in the pair of lenses for chromatic aberration correction in the second vertical stack is part of a laterally contiguous lens array that does not include the higher-dispersion lens in the pair of lenses for the chromatic aberration correction of the first stack.

19. The module of claim 18 wherein the laterally contiguous lens array includes a field-dependent aberration correction lenses in the first vertical stack.

20. The module of claim 18 including a second laterally contiguous lens array that includes a field-dependent aberration correction lenses in each of the first and second vertical stacks.

21. The module of claim 18 wherein the lenses in a particular one of the laterally contiguous arrays are composed of the same material as one another.

22. The module of claim 21 wherein the module includes a laterally non-contiguous array including the first lens of the pair of lenses for chromatic aberration correction in the second vertical stack and the second lens of the pair of lenses for chromatic aberration correction in the first vertical stack.

23. The module of claim 21 wherein the first lens of the pair of lenses for chromatic aberration correction in the first vertical stack and the first lens of the pair of lenses for chromatic aberration correction in the second vertical stack are composed of a respective material having an Abbe number greater than 55 and a refractive index in a range of 1.51-1.54.

24. The module of claim 21 wherein the second lens of the pair of lenses for chromatic aberration correction in the first vertical stack and the second lens of the pair of lenses for chromatic aberration correction in the second vertical stack are composed of a respective material having an Abbe number less than 35 and a refractive index greater than 1.56.

* * * * *